April 4, 1950            E. C. WARD            2,502,684
FISHING POLE HOLDER
Filed May 18, 1946            2 Sheets-Sheet 1
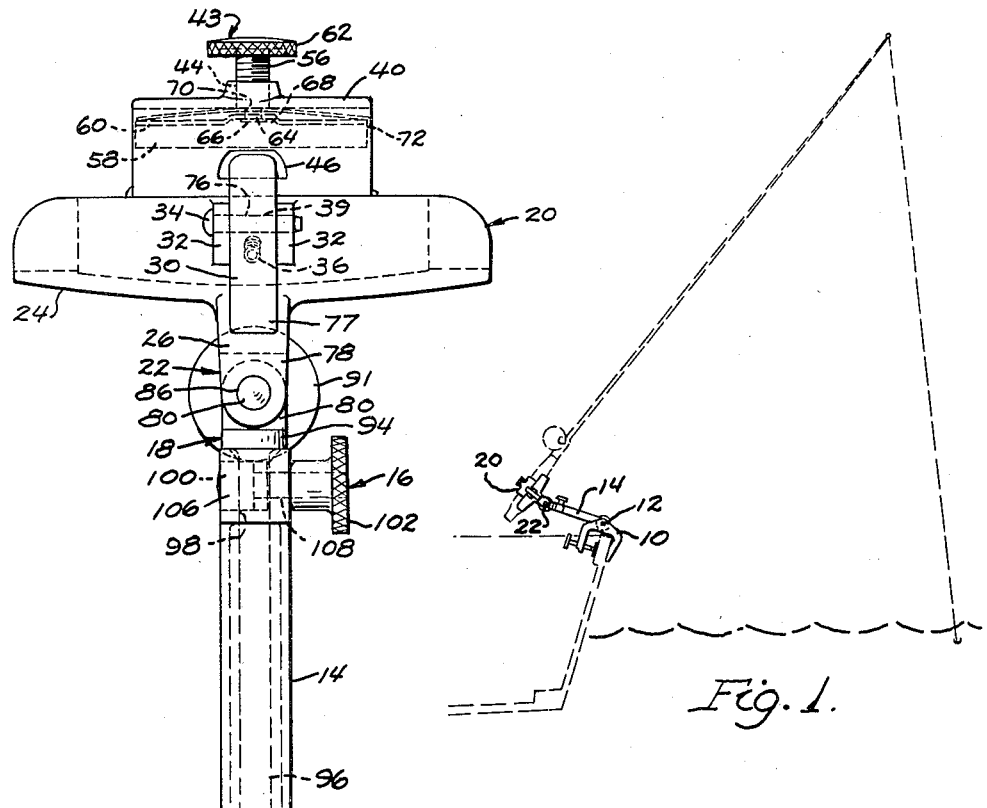
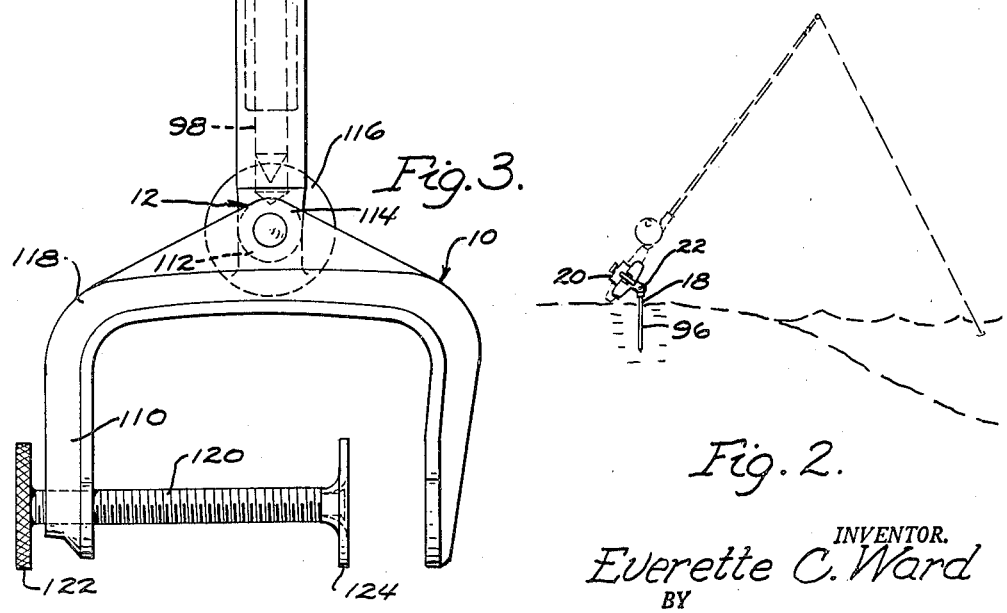
INVENTOR.
Everette C. Ward
BY
A. L. Wilson
ATTORNEY.

April 4, 1950          E. C. WARD          2,502,684
FISHING POLE HOLDER
Filed May 18, 1946          2 Sheets—Sheet 2
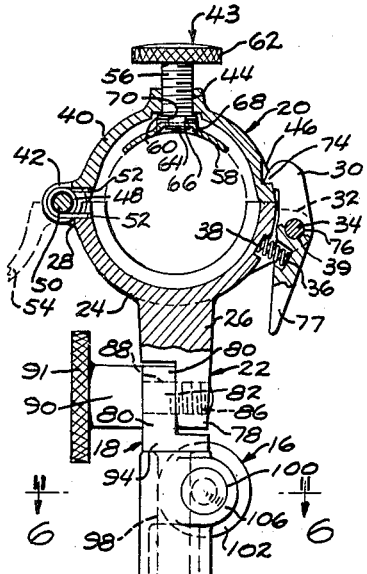
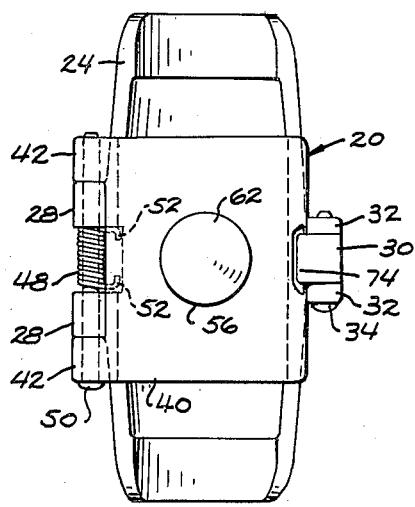
Fig. 5.
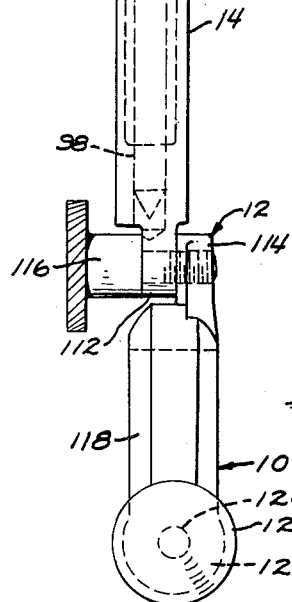
Fig. 6.
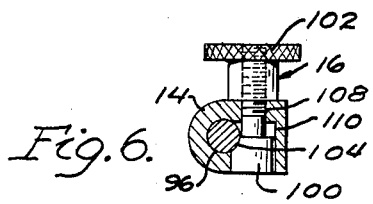
Fig. 4.
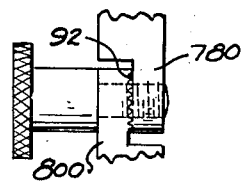
Fig. 7.
INVENTOR.
*Everette C. Ward*
BY
ATTORNEY.

Patented Apr. 4, 1950

2,502,684

UNITED STATES PATENT OFFICE 2,502,684

FISHING POLE HOLDER

Everette C. Ward, Garden City, Mich.

Application May 18, 1946, Serial No. 670,803

3 Claims. (Cl. 248—42)

This invention relates to fishing rod holders for fishermen who desire to relax, sleep or mix other activities with fishing.

An object of this invention is to provide a fishing rod holder adapted to securely engage and quickly release the handle of a fishing rod.

Another object is to provide a fishing rod holder capable of a wide range of angular adjustment, and which can be securely held at any desired angle.

A further object is to provide a fishing rod holder that can readily be attched to various objects such as the sides or transom of a boat, rail seats, or any rigid object that will fit between the jaws of a clamp.

A still further object is to provide a fishing pole holder that can be adapted for right handed or left handed operation.

Yet a further object of my invention is to provide a fishing rod holder that is easily adjusted to engage fishing rod handles of various sizes and shapes.

Another object is to provide a fishing rod holder having a member that is adapted to be driven into the ground or part of a dock or piling when fishing from the shore.

Yet another object of my invention is to provide an improved fishing rod holder of simple design and sturdy construction.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawing wherein similar reference characters refer to similar parts throughout the several views:

Fig. 1 is a somewhat diagrammatic view of my fishing rod holder in use on the transom of a boat.

Fig. 2 is a somewhat diagrammatic view of my fishing rod holder in use from the shore.

Fig. 3 is a side elevation of the fishing rod holder.

Fig. 4 is an end view with parts broken away.

Fig. 5 is a plan view of the cradle.

Fig. 6 is a sectional view taken substantially on the line 6—6 of Fig. 4 looking in the direction of the arrows.

Fig. 7 is a side elevational view of a modified form of connection.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Fig. 3 it will be observed that my improved fishing rod holder comprises a clamp 10 having a joint or connector 12 whereby it is adjustably attached to a hollow standard 14 having at its upper end a clamping device 16 to engage and hold a detachable pale 18 telescoped in the standard 14. The pale 18 is attached to a fishing pole receiving cradle 20 by a second adjustable joint or connector 22.

The pole receiving cradle 20 consists of hinged base and cap members of semicylindrical contour adapted to receive and accommodate a wide range of shapes and sizes of fishing rod handles.

The base 24 is provided with a mount 26 and hinge parts 28, and carries a latch 30 pivoted in bosses 32 on a pin 34. The latch 30 is urged into its engaged position with the cap by a spring 36. The spring 36 seats at one end in a recess 38 in the base 24, and extends into a bore 36 in the latch 30.

The cap 40 has hinge parts 42, an adjusting device 43 projecting into a threaded bore 44, and recess 46 to receive the latch 30 of the base 24.

A spring 48 is positioned between the hinge parts 28 and 42 on the hinge pin 50 has extended ends 52 adapted to engage and urge the cap 40 toward its open position partially indicated at 54 in Fig. 4.

The adjusting device 43 consists of an adjusting screw 56, a saddle 58 and a spring 60. The adjusting screw 56 is enlarged at its outer end to provide a manually operable knob 62, and at its inner end is provided with a reduced portion 64 rotatably engaging the leaf type spring 60. The saddle 58, shaped to engage the handle of a fishing pole, is slidingly mounted on the reduced portion 64 of the adjusting screw 56 by a riveted construction as illustrated at 66.

The saddle 58 is shaped to fit over the largest diameter fishing pole handle that may be fitted into the cradle, and has a recess 68, perforated at 70 to fit the reduced portion 64 of the adjusting screw 56 to provide space for riveting the end of the reduced portion of the screw 56.

The spring 60 is preferably of rectangular cross section and is bowed to exert a downward force on the saddle 58. The spring 60 is perforated at 70 to fit the reduced portion 64 of the adjusting screw 56 and extends over and turns downward at one end of the saddle 58. This downturned portion 72 in cooperation with the perforation 70 prevents the spring 60 from rotating relative to the saddle 58.

The latch 30 has a catch 74 normally engaged in the recess 46 in the cap 40, and extends downwardly to its bearing 76 and is held against endwise movement by being accommodated between the bosses 32. From the bearing 76 the latch extends downwardly forming a release lever 77.

The joint 22 between the pale 18 and the cradle 20 comprises an ear 78 extending downwardly from the mount 26 juxtaposed to an ear 80 extending upwardly from the pale 18. A screw 82 is provided to engage a threaded bore 86 in the ear 78, and forms a pivot for the ear 80 in hole 88. The screw 82 has an enlarged portion 90 normally forcing the ears into a non-rotational frictional engagement. A knob 91 is provided for tightening the screw 82. The joint may if desirable be provided with positive means to hold it in any adjusted position. One desirable form of holding means consists of the use of serrations 92 on the ears 78 and 80 as illustrated in Fig. 7.

The pale 18 has the ear 80 carried by an enlarged head portion 94, and has a downwardly extending spike 96 adapted to project into the bore 98 of the standard 14. The spike 96 may be held against rotation or withdrawal from the standard 14 by the clamping device 16 best illustrated in Fig. 6.

Referring now to Fig. 2 it will be noted that the assembly of the cradle and the pale can be withdrawn from the standard and used by itself as a fishing pole holder.

The clamping device 16 consists of a bolt 100 and a nut 102. The bolt 100 has an arcuate portion 104 adapted to be drawn against the spike 96 when the nut 102 is turned to tighten the clamping device to securely engage and clamp the spike in place.

The standard 14 is of substantially cylindrical form having the bore 98 extending longitudinally therethrough to receive the spike 96. The standard 14 has a boss 106 positioned at its upper end. The boss 106 has a hole 108 and a recess 110 formed therein to accommodate the clamping device 16.

At its lower end the standard 14 has a perforated ear 112 functionally similar to the ear 80. The joint 12 at the bottom of the standard 14 is composed of the perforated ear 112 carried by the standard 14 and a threaded ear 114 carried by the clamp 10. A screw 116 projects through the ear 112 and threads into the ear 114 to provide a joint similar to the joint 22. The serrations illustrated in Fig. 7 may be employed if desired to provide positive actuation.

The clamp 10 having a body 118 bearing the threaded ear 114 is generally similar to the familiar C clamp having a screw 120 adapted to be actuated by a knob 122, a washer 124 being rotatably riveted to its clamping end to engage and clamp any suitable object that will fit in the space provided such for example as the transom of a boat.

The operation of this device to hold a fishing pole is as follows:

The clamp 10 is secured to any convenient part of a boat or structure that will fit in the clamp. The joints 12 and 22 are then freed by loosening the screws 116 and 82 and the cradle 20 is moved to a desired position and angle whereupon the screws 116 and 82 are tightened.

The latch release lever 77 is then depressed, freeing the catch 74. The cap will now pivot into its opened position, indicated at 54 in Fig. 4 through action of the spring 48. The handle of a fishing rod is then placed in the base 24 and the cradle 20 is closed around the handle by pivoting the cap 40 back to its closed position where it will engage the catch 74 in the recess 46. The saddle 58 is then adjusted to the desired pressure on the handle of the fishing rod by turning the knob 62. The holder is now ready for use.

The holder will maintain the rod in the set angular relations whereupon the angler can devote his attention to other things, merely observing the rod periodically. When a catch has been made the rod will bend under the influence of the pull of a fish on the line. The angler then grasps the rod with one or both hands and actuates the latch release lever 77 to release the rod. The angler then endeavors to catch the fish in the usual manner. When the fish has been caught or the effort abandoned, the angler baits the line and after making the cast to position the line in the water, replaces the rod in the holder by merely positioning it on the base 24 and closing the cradle 20 over the base of the rod.

It will be noted that the clamp 10 can be turned to present the screw 116 on either the right or left side and that if the nut 102 is loosened, the pale and cradle combination can be revolved to present the latch 30 on either the right or left side as desired.

If the angler is fishing from the shore, my fishing rod holder can be used as shown in Fig. 2. The clamping device 16 is loosened and the combination of the cradle 20 and the pale 18 is removed from the standard 14 by withdrawing the spike 96. The spike can then be pushed into the ground, and the joint 22 adjusted to a selected angle. The holder is now ready for use as explained above.

If desired the cradle and pale combination can be used with the spike driven into wood or other material.

It will also be noted that the cradle 20 with the pale 18 can be rotated in relation to the standard 14 and can be secured at any point by tightening the clamping device 16.

If desired a universal joint connection may be interposed between the clamp 10 and the lower end of the standard 14, and between the cradle 20 and the upper end of the standard 14 to permit varying the angular relations of the respective parts whereby the cradle 20 may be positioned at any desired angular relation relative to the clamp 10. Where this expedient is resorted to the universal joints should of course embody means whereby they can be tightened to maintain the parts in any desired adjusted positions.

I claim:

1. A holder for fishing rods or the like, comprising a clamp, a tubular standard connected to said clamp by a horizontal pivot, a cradle for releasably retaining a fishing rod or the like, a pale engageable in said standard in telescoping relation and connected to said cradle by a horizontal pivot, and means for selectively rendering said pivots inoperative.

2. A holder for fishing rods or the like, comprising a clamp for engaging a boat or the like, a tubular standard connected to said clamp by a transverse pivot, a cradle for releasably receiving a fishing rod or the like, a pale rotatably receivable in said standard in telescoping relation and connected to said cradle by a transverse pivot, means for selectively rendering said pivots inoperative, and means for preventing movement of said pale relative to said standard.

3. The invention defined in claim 2, wherein the cradle comprises cap and base portions hinged to each other and secured in closed relation by a quick-releasing latch, and one of said portions is provided with a yielding adjustable member for engaging the rod or the like.

EVERETTE C. WARD.

REFERENCES CITED

The following references are of record in the file of this patent:

UNITED STATES PATENTS

| Number | Name | Date |
|---|---|---|
| 122,370 | Doolittle | Jan. 2, 1872 |
| 278,973 | Kizer | June 5, 1883 |
| 635,612 | Tardel | Oct. 24, 1899 |
| 1,459,438 | Brand | June 19, 1923 |
| 1,534,642 | Hoagland | Apr. 21, 1925 |
| 2,184,583 | Danko | Dec. 26, 1939 |
| 2,311,823 | Gaskill | Feb. 23, 1943 |

FOREIGN PATENTS

| Number | Country | Date |
|---|---|---|
| 518,237 | Germany | Feb. 13, 1931 |